April 22, 1969　　　　　E. W. HINES　　　　3,439,936
STABILIZING CONTROL FOR ARTICULATED VEHICLES
Filed July 14, 1967　　　　　　　　　　　　Sheet 1 of 4

INVENTOR.
EUGENE W. HINES
BY
ATTORNEY

INVENTOR.
EUGENE W. HINES

BY
ATTORNEY

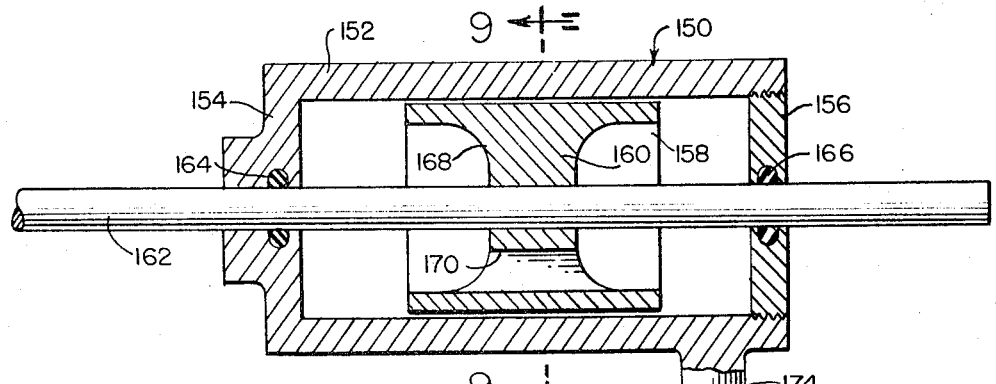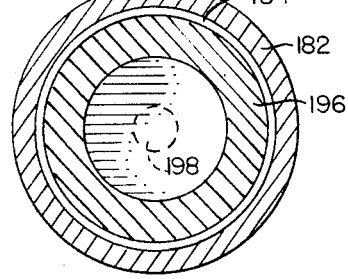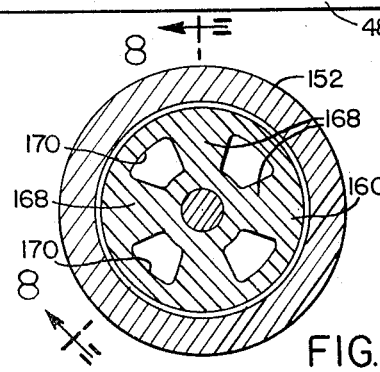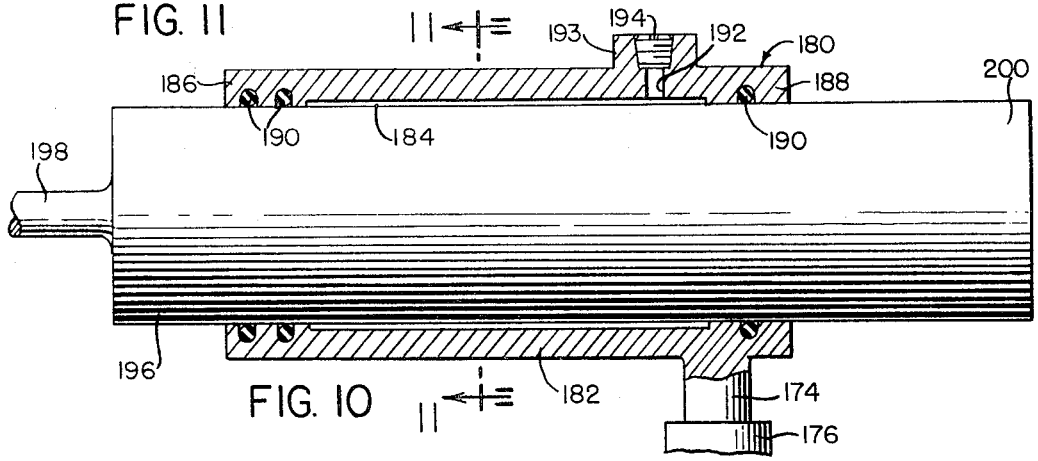

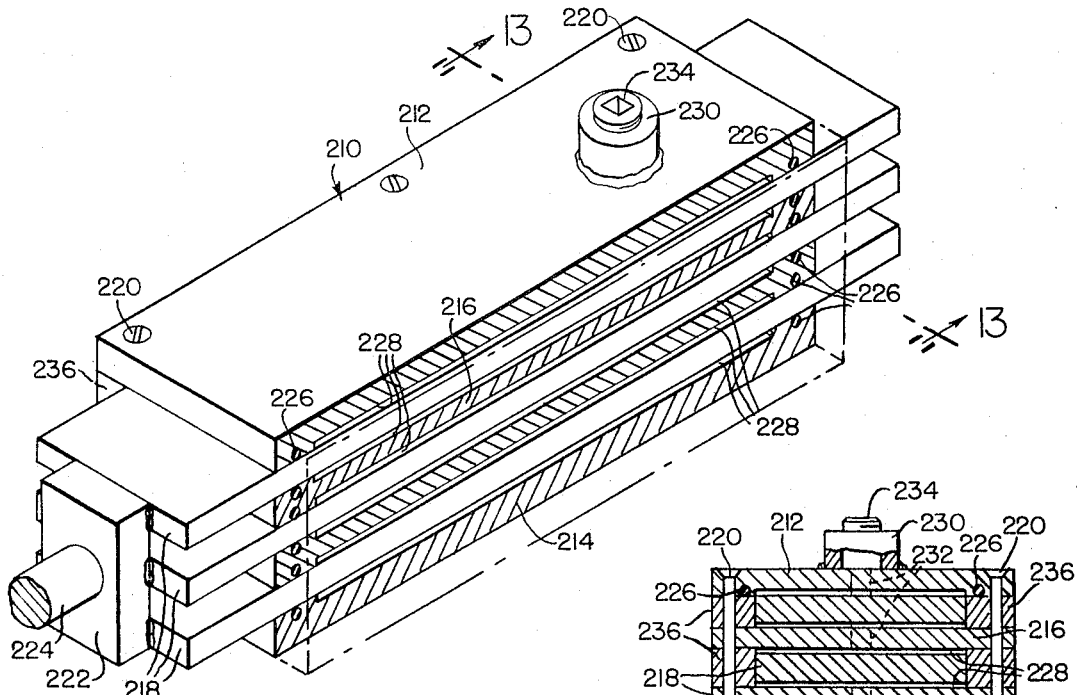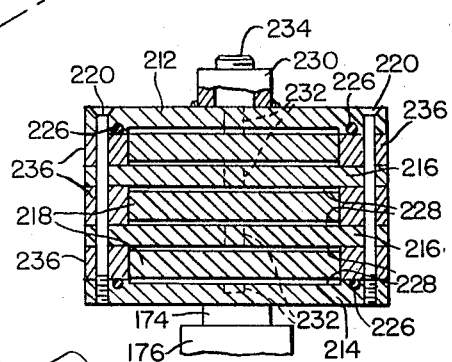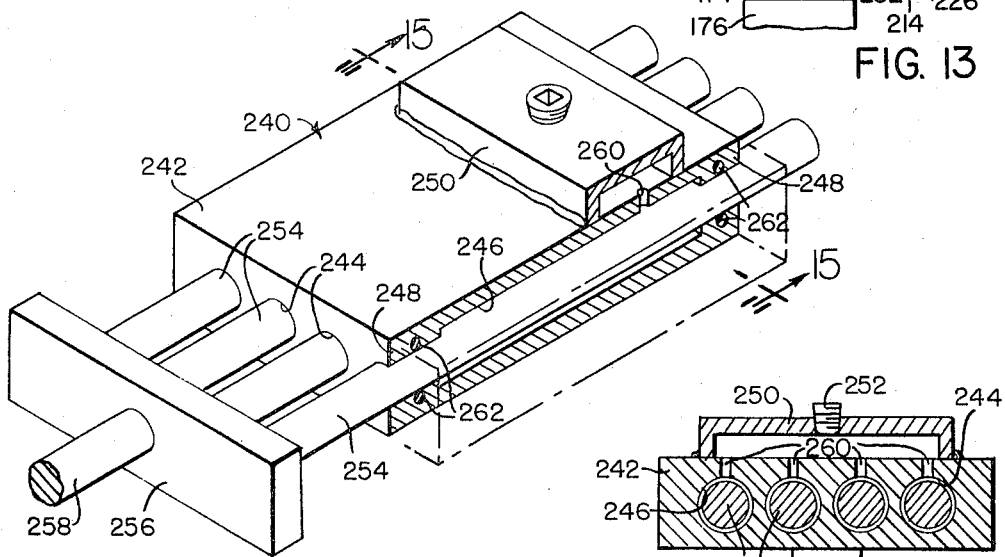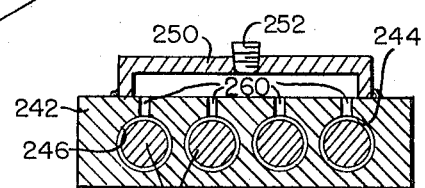

United States Patent Office 3,439,936
Patented Apr. 22, 1969

3,439,936
STABILIZING CONTROL FOR ARTICULATED VEHICLES
Eugene W. Hines, Saline, Mich., assignor to Highway Products, Inc., Royal Oak, Mich., a corporation of Michigan
Filed July 14, 1967, Ser. No. 653,523
Int. Cl. B62d 53/06
U.S. Cl. 280—432　　　　　　　　　　　　　27 Claims

ABSTRACT OF THE DISCLOSURE

This invention pertains to an improved stabilizing control device for use with the drawn vehicle of a tractor-trailer combination, in which a viscous fluid damper is employed to reduce or eliminate excessive oscillating shifts of the drawn vehicle and uncontrolled rotation of the trailer, whereby skidding, sidesway, or jack-knifing can be prevented or substantially eliminated. The device of this invention utilizes a viscous fluid damper of the rotary or linear type in combination with a kingpin having an arm or "dog" secured thereto for engagement with and responsive to rotation of the fifth wheel of the drawing vehicle.

---

The inventive combination may take one of two forms. In the rotary combination, the inventive device comprises a rotary type viscous fluid damper secured to the wear plate of a trailer vehicle with a kingpin extending therebelow in the area provided for its engagement by the fifth wheel of a draft or tractor vehicle. The fifth wheel has an open throat whose lateral sides lie closely adjacent the kingpin lever arm or "dog," so that any turning movement of the fifth wheel actuates responsive rotation of the viscous damper. In the linear form of the device, a viscous fluid damped is pivotally mounted on the trailer for oscillating movement, and is also secured to a kingpin mounted rotational control plate whereby the rotation of the kingpin in response to sway or turning of the trailer is damped by the linear damper. As in the rotary damper device, a kingpin affixed lever arm is in direct engagement with and is responsive to rotative movement of the fifth wheel secured to the tractor vehicle.

Prior art control devices to prevent excessive sway, overturning and jack-knifing have utilized hydraulic fluid devices in combination with trailer kingpins. Each of these devices has had a principal limitation in that the control exercised by these devices was dependent upon orifices through which the hydraulic fluid was caused to pass, and the dimensions of these orifices were such that when smaller, they were subject to plugging up or restriction by dirt or other contaminants contained within the hydraulic fluid or generated by the hydraulic fluid. When a control orifice should be restricted, or filled or plugged so that hydraulic fluid could not pass through it or only to a very limited degree, less than that for which it had been designed, then turning of the drawn vehicle was limited and, under certain conditions of roadway hazard, control of the drawn trailer as well as that of the drawing vehicle was lost to a dangerous degree.

It should also be noted that in a damper having its control dependent entirely upon the passage of hydraulic fluid through an orifice or port, the slightest restriction of area in the port represents a direct proportional reduction of the available through-flow of fluid. As an example, if the port through which the hydraulic fluid was caused to pass by operation of a damper having a rotatable vane should be $\frac{1}{8}''$ in diameter, the port area would be .0123 square inch. The reduction in diameter of the port opening by as little as $\frac{1}{64}$ of an inch would result in a reduction of this area to .0094 square inch, or by almost 24%. In the device of the instant invention, a viscous damper having substantially large areas of contact with a viscous fluid which is put into shear by such surfaces effects a damping of the rotation or oscillations which can result in the dangerous effects to which reference has been made above.

The viscous damper disclosed herein is a modification of and similar to that disclosed in O'Connor U.S. Patent No. 2,514,137 issued July 4, 1950 for "Viscous Rotary Damper Structure." Reference is made to the aforesaid patent in respect to the functional operation of one of the viscous fluid dampers, utilized in the combination disclosed and taught herein. The damper operates upon the principle of the shear resistance of viscous fluid trapped between two relatively moving surfaces. As these surfaces move relatively to each other upon the viscous fluid, the latter's resistance to shear by such surfaces slows down and retards and resists the relative movement of the surfaces. Thus, in the instant structure, the kingpin which is secured to or integrally formed with the rotor of the damper effects a shear reaction upon the viscous fluid in the damper structure when the kingpin secured actuating lever arm is rotated by the tractor fifth wheel, the legs of which are disposed on each side of and closely adjacent the kingpin lever arm. And, in the case of the linear damper combination, viscous fluid shear resistance is effected upon relative movement of cylindrical surfaces or by relatively sliding flat surfaces, to the same effect. The viscous fluid which can be used in the dampers disclosed herein include Dow-Corning No. 210 and 210H silicone fluids which are dimethyl polysiloxane fluids having a high resistance to shear and especially developed to provide physical stability and uniform performance in mechano-fluid devices and controls, or substantial equivalent of such fluids may be used. The two fluids are basically similar, differing only in oxidation stability. The shear resistance, measured in "centistokes," is dependent upon the particular physical and chemical characteristics of the fluids, and for the control devices hereindisclosed may range from a low of the order of about 1,000 up to as high as 1,000,000 centistokes, or in particular cases even higher. Since the load characteristics of the viscous dampers utilized in the inventive combination herein disclosed and claimed will vary dependent upon a great many factors including but not limited to the size and functional characteristics of the drawing tractor, the size and suspension characteristics of the drawn trailer, the weight and size of the load in the trailer, as well as many additional factors, selection of a suitable viscous fluid will involve all of these considerations. By virtue of this shear resistance in the viscous fluid of the damper, the stabilizing effect upon an articulated drawn vehicle, such as a trailer, van, house trailer, camp trailer or other similar vehicles, substantially reduces or eliminates undue swaying, skidding and/or jack-knifing of the trailer relative to the drawing or tractor vehicle.

A principal object of the invention is to provide in a stabilizing control device for articulated vehicles a viscous fluid type damper associatedly conjoined to a kingpin device in which the damping action against rotative movement of the kingpin is dependent upon the shear resistance of the viscous fluid trapped between relatively moving surfaces of the damper. A further object is to provide a stabilizing control device having the damper housing fixedly attached to the articulated drawn vehicle, and having a kingpin secured lever arm disposed for rotative engagement by the fifth wheel member of a drawing or tractor vehicle. Yet a further object is to provide a stabilizing control device embodying a rotary form of a viscous fluid-type damper in which the rotor of the damper operating upon viscous fluid is associatedly conjoined to a conventional kingpin element designed for engagement by the fifth wheel of a tractor or drawing vehicle. Yet another object is the structural combination of a viscous fluid-type damper and a kingpin device in which rotative movement of the kingpin is limited to an angular sector defined by stop elements affixed to the kingpin and to its associated support.

These and additional objects of the invention and features of construction will become more clearly apparent from the specific description given below, in which the terms employed are used for purposes of description and not of limitation. Reference is made to the drawings annexed hereto and forming an integral part of this specification, in which:

FIGURE 8 is a vertical sectional view showing another form of linear damper disposed for rotation upon the support plate of a drawn vehicle, taken substantially on the line 8—8 of FIGURE 9.

FIGURE 9 is a transverse vertical sectional view taken substantially on the line 9—9 of FIGURE 8.

FIGURE 10 is a vertical sectional view illustrating another type of linear damper, taken axially and longitudinally thereof.

FIGURE 11 is a transverse vertical sectional view taken substantially on the line 11—11 of FIGURE 10.

FIGURE 12 is a perspective view, partially in section, illustrating another form of a viscous fluid linear damper.

FIGURE 13 is a transverse vertical sectional view taken substantially on the line 13—13 of FIGURE 12.

FIGURE 14 is a perspective view of yet another form of viscous fluid linear damper.

FIGURE 15 is a transverse vertical sectional view taken substantially on the line 15—15 of FIGURE 14.

Figure 1:
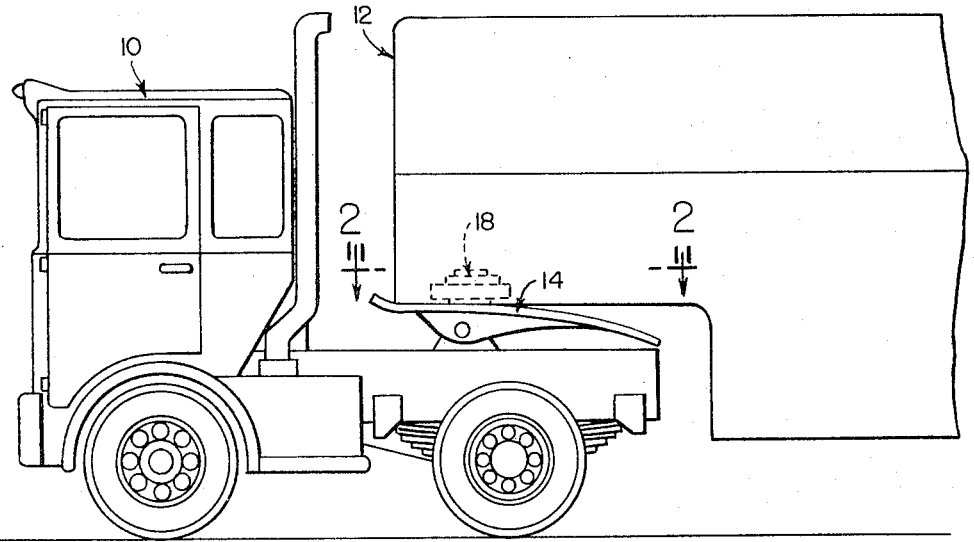
FIGURE 1 is a side elevational view of a tractor drawn trailer (the latter in fragmentary showing only), the stabilizing control device being shown in broken line at the lower left portion of the trailer, in the area of the fifth wheel.
Figure 2:
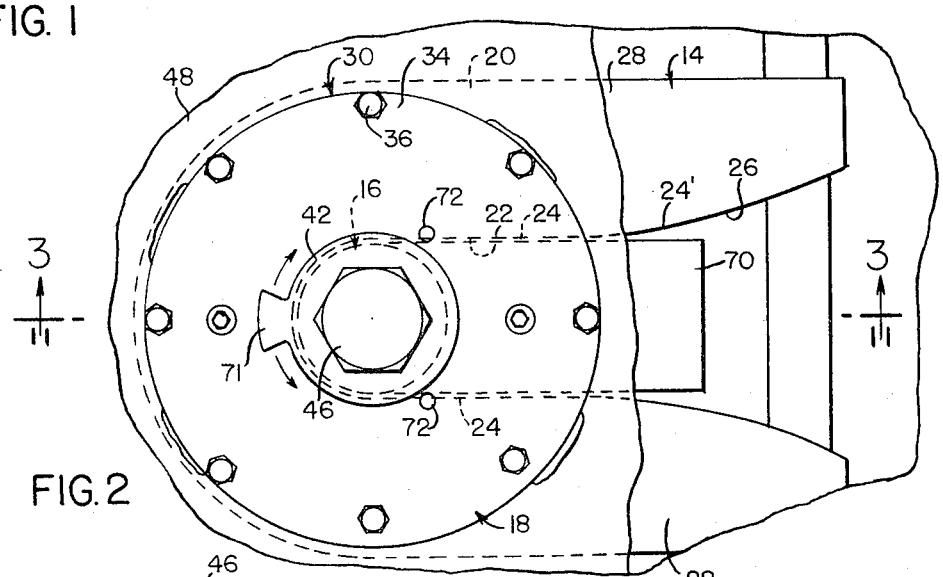
FIGURE 2 is an enlarged fragmentary plan view taken substantially on the line 2—2 of FIGURE 1.
Figure 3:
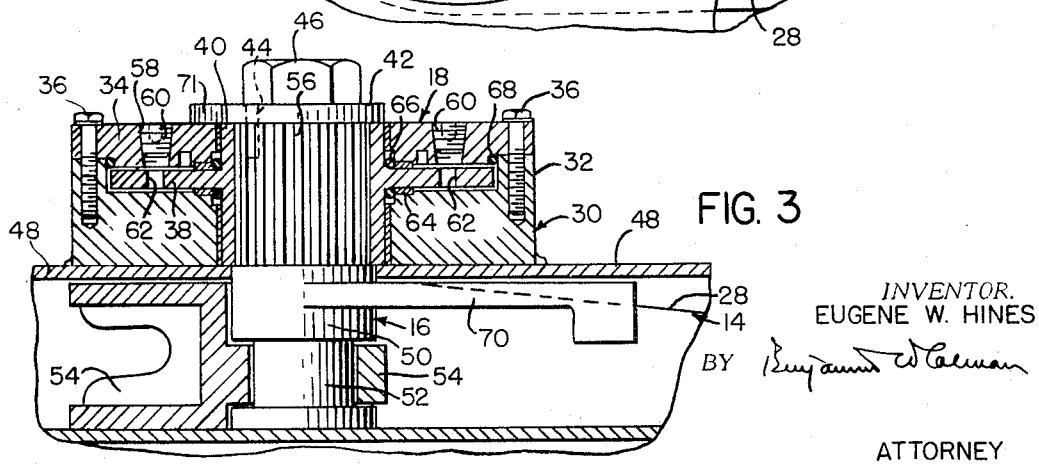
FIGURE 3 is a substantially vertical elevational view taken substantially on the line 3—3 of FIGURE 2.

As illustrated in the several views of the drawings, and more particularly in FIGURES 1, 2 and 3 constituting illustrations of the stabilizing control device embodying a rotary form of viscous fluid damper, the tractor 10 and the trailer 12 are connected together by a conventional fifth wheel structure 14 and by the kingpin 16 forming an integral part of the stabilizing control device 18.

The tractor 10, although illustrated as a cab-over-engine type vehicle, can be any form of drawing vehicle, either self-propelled or otherwise movable. The trailer 12, although illustrated as a van-type or enclosed trailer, can be a flat bed, a walled, a roofed, or other type of trailer or drawn vehicle, supported upon rolling wheels and the fifth wheel 14 of the drawing or tractor vehicle. To persons skilled in the art, these units 10 and 12, encompassing a considerable variety or modified forms of vehicles arranged in an articulated connected fashion, are readily understood.

The fifth wheel 14 generally comprises a supporting plate portion 20 arranged about a slot 22 having substantially parallel sides or edges 24, 24, the slot opening into a widening throat 26 defined by the edges 24', 24' of the two lateral flanges 28, 28 of the fifth wheel. The fifth wheel 14 is generally arranged for vertical pivoting upon a horizontal pivot member and according to conventional construction generally well known in the art to which the fifth wheel device pertains. No change in the fifth wheel is comprehended or required in respect to the inventive device herein disclosed and claimed.

The stabilizing control device 18, of which the kingpin 16 forms an essential element, generally comprises a viscous damper 30 (in rotary form for the device illustrated in FIGURES 1, 2 and 3) having a housing 32, a top plate 34 secured to the housing 32 by bolts 36, an internal rotating member or rotor 38 integrally formed with a hub member 40 to which the kingpin 16 is fixedly secured or with which it is integrally formed, and a rotational control plate 42 secured to the kingpin 16 by a positioning dowel 44 and a locking bolt 46 threaded into the kingpin 16. The damper housing 32 is secured to the wear plate 48 of the tractor 12 by welding or other suitable means, depending upon the particular construction of the trailer in the area where the kingpin is normally and conventionally disposed for its engagement by the fifth wheel 14 of the tractor. For instance, to secure the device 18 to the trailer the housing 32 could be arranged with an outwardly extending flange designed to receive bolts which pass through the flange and the wear plate, or through the flange and laterally disposed transverse beams or other members. That portion of the stabilizing control device which has just been described is arranged in position above the wear plate 48, leaving the lower portion 50 of the kingpin 16 depending below the wear plate for engagement by the fifth wheel device. This depending portion 50 has a reduced portion or neck 52 engageable by a locking hook 54 of conventional construction forming part of the fifth wheel device 14. As is shown more clearly in FIGURE 3, the upper portion 56 of the kingpin 16 is splined to dovetail with the complementary splines in the rotor hub 40.

The viscous fluid for damper 30, which operates upon the principle of the shear resistance of viscous fluid disposed between the rotor plate 38 and the mating surfaces of the housing 32 and the mating surface of the top plate 34, is introduced into the chamber formed by the housing and the top or cover plate and against these surfaces through threaded inlet openings 58 in the plate 34 which are closed by the threaded plugs 60, 60. The viscous fluid passes to the mating surfaces of the rotor 38, the housing 32 and the top plate 34 through a plurality of passages 62, 62 (FIGURE 3) in the rotor flange. Although the spacing between the rotor flange 38, the top plate 34 and housing 32 is shown to be in the form of a gap, actually these surfaces are very close together, the drawing being necessarily an exaggeration of the mating and facing relationship on each side of the layer of viscous fluid introduced therebetween. To maintain the relative relationship between the surfaces, a pair of thin disc thrust washers 64, 64 are located adjacent the ring seals 66, 66 at the hub 40. A third ring seal 68 is located adjacent the outer peripheral edge of the rotor flange 38.

Securely affixed to the lower portion 50 of the kingpin 16 and disposed below the wear plate 48 of the trailer body, for disposition in the open slot 22 and widening throat 26 of the fifth wheel device 14, is the lever arm or dog 70. The lever arm may be integrally formed with the kingpin portion 50 or it may be secured by welding or other suitable means whereby it is positively and firmly affixed thereto, so that upon rotation of the lever arm the rotor plate 38 and the rotational control plate 42 are simultaneously moved. The lever arm 70 lies fully within the slotted area of the fifth wheel device 14, engageable by the fifth wheel plate side edges 24, 24 and 24', 24', and responsive to rotation of the fifth wheel device.

The rotor plate 42, which is secured by the screw 46 to the upper splined portion 56 of the kingpin, is rotatable within the limits defined by the plate lug 71 and the two dowel pins 72, 72, disposed in the top plate 34. As shown, these pins allow a free rotation of the lever arm 70 and the rotor plate 38 of approximately 104° on each side of center, as illustrated in FIGURE 2.

Figure 4:
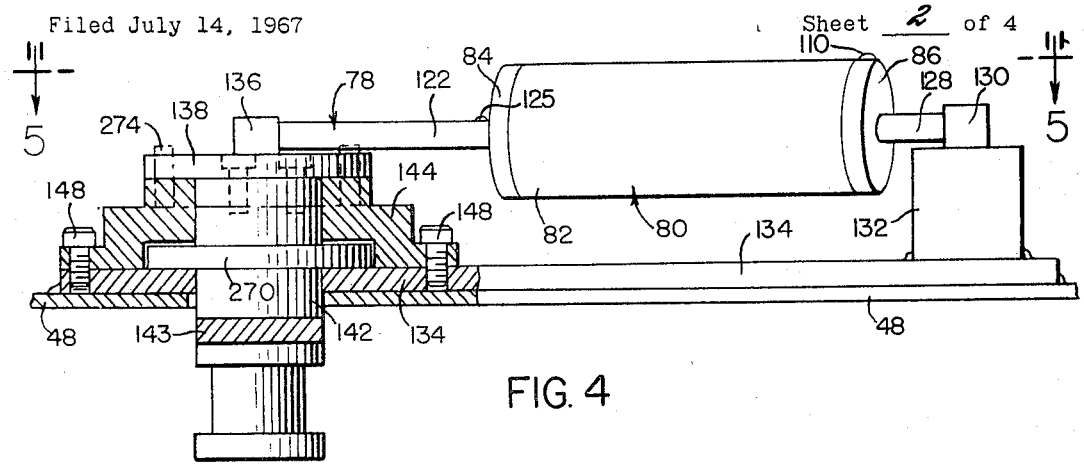
FIGURE 4 is a side elevational view, partially in vertical section, of the inventive combination embodying a linear type viscous fluid damper.
Figure 5:
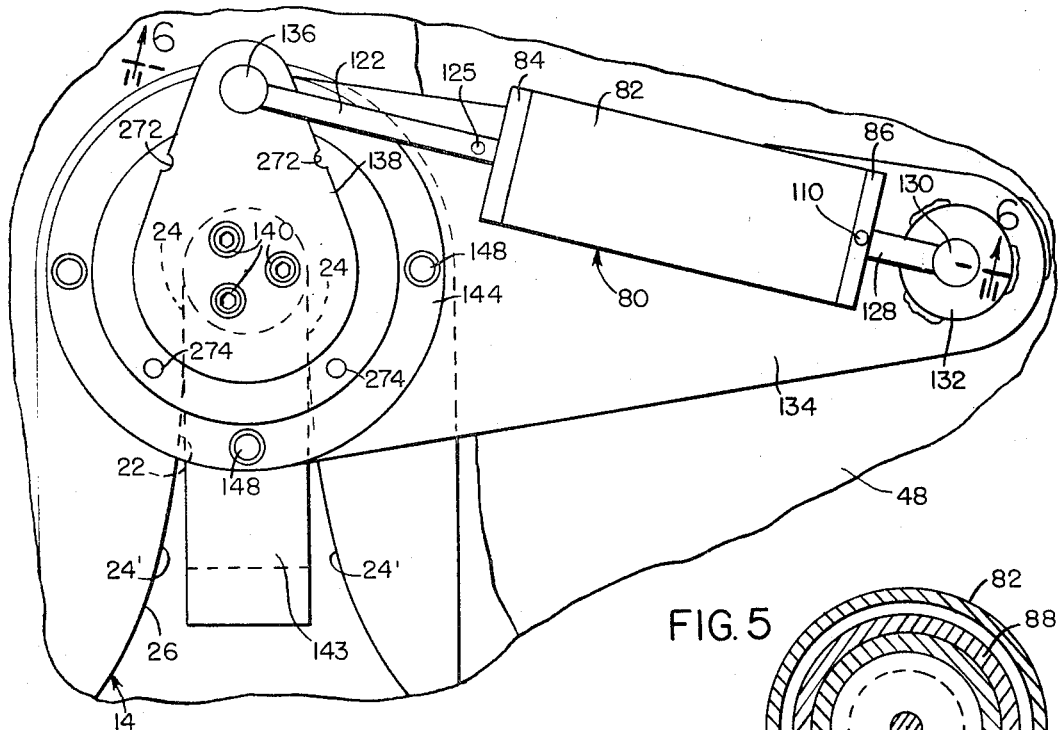
FIGURE 5 is a top plan view taken substantially on the line 5—5 of FIGURE 4.
Figure 7:
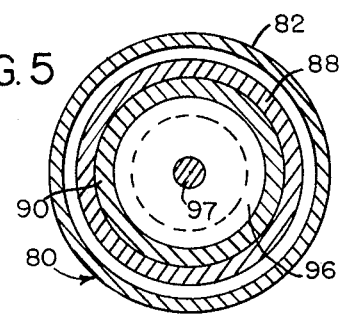
FIGURE 7 is a transverse vertical sectional view taken substantially on the line 7—7 of FIGURE 6.
Figure 6:
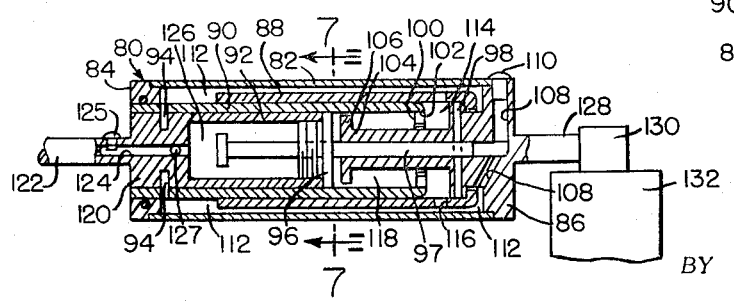
FIGURE 6 is a fragmentary vertical sectional view through the linear damper illustrated in FIGURES 4 and 5, taken substantially on the line 6—6 of FIGURE 5.

As illustrated in FIGURES 4, 5 and 6 of the drawings, a viscous-type linear damper is also utilizable in the stabilizing control device 78 of this invention. The general structure of the linear damper is best illustrated in the longitudinal vertical sectional view of FIGURE 6 and the transverse view of FIGURE 7. The damper device 80 comprises an outer cylinder 82 secured between two end heads 84, 86, an inner cylinder 88 secured to the heads 86, a complementary concentric and inner cylinder 90 disposed in telescopic sliding relationship within the cylinder 88, and a concentric inner sleeve 92 secured to the cylinder 90 by pins 94, 94 and having a plug 96 threadedly secured in the end of the sleeve. The end head 86 is arranged with a headed pin 97, secured thereto by a cross-pin 98, permitting limited longitudinal travel of the sleeve 92 until the plug 96 meets the head 99 of the pin. The cylinder 90 is arranged with an end plate 100 having a plurality of perforations 102 spaced concentrically about the bearing 104 integrally formed with or fixedly secured to the end head 86. This bearing is provided with a flange 106 designed to limit the longitudinal travel of the sleeve 92. The end head 86 is provided with a passage 108, plugged by a pin or other suitable means 110 at the outer surface of the end head and communicating with the chamber 112 formed by the outer cylinder 82 with the end heads 84, 86. Within this chamber the viscous fluid, introduced through the passageway 108, is operative. The fluid passes to the chamber 114 formed by the cylinder 88 through ports 116 in that cylinder, and to the chamber 118 through ports 102 in the end plate 100 of inner cylinder 90. The sleeve 92 is provided with an end portion or head 120 and an integrally formed piston pin 122 through which the passage 124 leading from chamber 126 of the sleeve is disposed, the viscous fluid passing thereinto from chamber 112 through the port 127. The passage 124 is plugged by a stop pin 125 in the end portion 120. At the other end of the damper 80, the end head 86 is arranged with an outwardly extending pin 128 having its head 130 disposed for rotation within the mount 132 fixedly secured to the damper support plate 134, which in turn is secured, preferably by welding, to the wear plate 48 of the trailer.

Thus, viscous fluid is dispersed throughout the linear damper 80 by introducing it through the passage 108 in the end head 86 to the chamber 112, through ports 116 in the inner cylinder 88 to the chamber 114, through ports 102 in the cylinder 90 to the chamber 118, from chamber 112 at the left end of damper 80 (FIGURE 6) through ports 127 to chamber 126 and through passage 124 to the discharge opening plugged by the stop pin 125. The digital end of pin 122 is secured to a head 136 disposed for pivoting movement on the rotational control or rotor plate 138 to which it is eccentrically secured, the latter plate being affixed by screws 140 to the king pin 142 rotatively mounted in the bearing plates 144 and 134 which are secured together by screws 148. The kingpin 142 with its integrally formed or fixedly secured lever arm 143 is disposed in substantially the same relationship in the trailer 12 upon and through wear plate 48 and to the tractor fifth wheel 14, as in the case of the device 18 in which kingpin 16 was combined with the viscous fluid rotary damper 30.

Additional and more simple forms of linear viscous fluid dampers also appear to be applicable to and can be embodied in the inventive combination hereindisclosed. These improved linear dampers are illustrated on the third and fourth sheets of drawings and will be described more particularly below in connection therewith.

One form of an improved linear viscous fluid damper is that illustrated in FIGURES 8 and 9, wherein the linear damper 150 comprises a cylinder 152, a hubbed end 154, an opposite end head 156 threadedly secured to the cylinder and adapted to be removable for cleaning or maintenance purposes, a piston sleeve 158 having a web 160 substantially medially thereof fixedly secured to a piston rod 162 which is disposed for movement substantially as is damper piston pin 122 illustrated in FIGURES 4 and 5, and functioning in substantially the same manner about the pivot 136. Viscous fluid seals 164, 166 are secured in the hubbed end 154 and the opposite end head 156, respectively, to keep the viscous fluid within the cylinder 152 at all times. The lengths of the cylinder 152 and the cylindrical piston 158 are subject to modification in order to accommodate the travel distance required in any particular application. The piston web or "spider" 160 is provided with radial spoke-like elements 168 forming openings 170 therebetween. These openings may be greater or lesser in area and they are subject to modification in respect to the viscosity of the viscous fluid utilized in the damper. The gap distance between the outer surface of the cylindrical piston 158 and the inner surface of the cylinder 152 is also subject to modification, as the shear characteristics of the viscous fluid therebetween may require. The piston rod 162 extends outwardly of the damper head 156 a distance sufficient to maintain full bearing contact in the head at all times regardless of the position of the cylindrical piston 158 as it may be moved within the cylinder 152. The cylinder 152 is supported upon a plate 172 (similar to the support plate 134 for the damper 80) by a pin 174 arranged for rotation in a mount 176 secured to the support plate 172, permitting the damper 150 to rotate or oscillate as the piston rod 162 is caused to move by the rotation of the rotor plate 138.

Another improved construction for a linear damper is that illustrated in FIGURES 9 and 10, wherein the linear damper 180 comprises a cylinder 182 having a slightly undercut counterbore 184 intermediate the ends 186 and 188 thereof, and having viscous fluid seals 190 in each of the ends of the cylinder. The cylinder is provided with a viscous inlet 192 in the boss 193 having a threaded plug 194 to close the inlet against fluid loss or contamination. The piston 196 for the cylinder 182 comprises an elongated rod having a connecting extension pin 198 secured thereto at one end thereof for attachment to the rotor pliate 138 (as in the form of damper 80 and illustrated in FIGURES 4 and 5), and a free end 200 extending outwardly of the cylindrical end 188 a distance sufficient to always maintain bearing contact with such end during any movement of the piston 196, as rotation of the rotor plate 138 may occasion. The extension pin 198 is secured to the kingpin 142 in a manner substantially identical with that illustrated in FIGURES 4 and 5. The damper 180 is arranged for rotative or oscillative movement by means of a mount substantially identical with the mount 174, 176 illustrated in FIGURE 8.

It will be appreciated from the foregoing description of improved linear dampers that amplification of multiplication of the viscous fluid resistance can be effected by a plurality of relatively moving surfaces. Such structures are illustrated in FIGURES 12 through 15, inclusive, and will be described specifically hereinbelow. In the improved plate type linear damper 210 illustrated in FIGURES 12 and 13, the damper comprises a fixed top plate 212, a fixed bottom plate 214 arranged with the rotative mount 174, 176 described above and illustrated in FIGURE 8 or other equivalent means for permitting rotation of the damper, a plurality of fixed intermediate spacer plates 216, a plurality of movable plate members 218 disposed alternatively between the top, bottom and intermediate plates 212, 214 and 216, respectively, a plurality of bolt or screw members 220 securing the fixed plates together, a connecting block 222 fixedly secured to the movable plates 218 outwardly of the fixed plates at one end thereof, and a draw pin 224 threadedly or otherwise secured to the block 222. A plurality of seals 226 in the end portions of the fixed plates are utilized between relatively moving surfaces in order to contain the viscous fluid in the gaps 228 formed in the fixed plates, into which the viscous fluid is charged.

The viscous fluid may be introduced into the gaps 228 between the relatively moving surfaces in any convenient manner, one form of such means comprising the fluid inlet boss 230 secured to the top plate 212 at the rearward end of the gaps 228 and a series of openings or holes 232 through the fixed plates 212, 216 and 214, all such holes or ports communicating with the gaps 228 between the relatively moving surfaces. The inlet opening in the boss 230 is capped or plugged by a threaded plug 234.

As in the case of the linear dampers illustrated in FIGURES 8 through 11, inclusive, the longitudinal ends of the movable plate members 218 extend beyond the fixed plates a distance sufficient to always maintain bearing contact with the fixed plates at the ends thereof regardless of of the longitudinal movement of the plate members 218. Spacer bars 236 are disposed in alignment with and on each side of the intermediate spacer plate members 218 and between the fixed plates to close the lateral edgs of the gaps 228, and to permit relative sliding movement of the plate members.

A fourth improved linear viscous fluid damper is that illustrated in FIGURES 14 and 15, in which the damper 240 comprises a block 242 having a plurality of openings 244 extending longitudinally therethrough, the openings having counterbored chambers 246 intermediate the ends 248, 248 of the block, a manifold housing 250 for introduction of the viscous fluid to the several counterbored chambers 246 in the block, the manifold being plugged by a screw 252, a plurality of cylindrical piston rods 254 disposed for sliding movement in each of the openings 244 and the counterbored chambers 246, a connecting block 256 secured to one end of each of the piston rods 254, a draw pin 258 secured to the block 256 and arranged for connection to the rotor plate 138 as in the form of the inventive combination illustrated in FIGURES 4 and 5, and a rotative support 174 secured to the block 242 to permit rotative or oscillative movement as in the linear damper arrangement illustrated in FIGURE 8. The viscous fluid introduced into the chamber 250 is passed to the counterbored gaps 246 through ports 260. Viscous fluid seals 262 are disposed about each of the piston rods 254 in the block ends 248, 248. Here again, the outward ends of the piston rods 254 extend beyond the end of the block a distance sufficient to always make full bearing contact with the outboard block end regardless of the extent of movement of the piston rods in the block.

Returning now to FIGURE 5 of the drawings, it will be seen that the draw pin 122 (and the draw pins 162, 198, 224 or 258 in each of the other linear damper devices) is secured to the rotor plate 138 by suitable means such as the rotative element 136. The kingpin 142 has secured thereto a flange 270 that rests and rotates upon the support plate 134 as a bearing. A lower portion of the kingpin 142 and the attached lever arm 143 project below the wear plate 48 in the area designed for engagement of the kingpin by the fifth wheel structure 14. The features of the fifth wheel device 14, as shown in FIGURE 5, are substantially identical with the fifth wheel structure illustrated in FIGURES 1, 2 and 3. Similarly, the lever arm or dog 143 is substantially identical with the lever arm 70 described above and illustrated in FIGURES 2 and 3. However, in the structure embodying any of the linear dampers hereinabove described and illustrated in FIGURES 4 through 15, inclusive, the rotor plate 138 is secured to the kingpin 142 is provided with a pair of notches 272, 272 designed to seat and complement the stop pins 274, 274 secured in the cover plate 144, thus permitting angular rotation in either direction of the rotor plate of approximately 104° from the center position illustrated in FIGURE 5.

In operation, the stabilizing control device of the instant invention, whether embodying a rotary or a linear viscous fluid damper, is directly attachable to the drawn or trailer vehicle upon the wear plate thereof in the area where the fifth wheel device 14 is normally engageable with a kingpin secured to the trailer. In the control device 18 utilizing the rotary viscous fluid damper 30, the shear in the viscous fluid takes place during rotation of the member 38 between the mating surfaces of the upper plate 34 and the housing 32, open areas therebetween being charged with viscous fluid introduced through one or both of the inlets 58 capped by the screws 60. As the trailer mounting the kingpin 16 sways or rotates due to road or traffic conditions encountered by the tractor-trailer combination, the fifth wheel slot edges 24, 24 will cause the lever arm 70 to rotate responsively and thus to rotate the plate member 38. The shear resistance of the viscous fluid measured in centistokes, effects a damping action of the rotation of the rotor plate 38, which except for such viscous fluid resistance would freely rotate within the damper housing 32 and top plate 34.

Similarly, the shear resistance of the viscous fluid introduced into any of the linear dampers described above and illustrated in FIGURES 4 through 15, inclusive, also effects a resistance against rotation of the lever arm 143 fixedly secured to the kingpin 142 mounting the rotor plate 138. In each of the several forms of an improved linear viscous fluid damper disclosed in FIGURES 4 through 15, shear resistance takes place between relatively moving surfaces upon the viscous fluid disposed between such surfaces. In the case of the damper 80, a number of cylindrical surfaces are telescopically related, with viscous fluid therebetween effecting a substantial resistance to rotative movement of the lever arm 143, damping the rotative action and effecting a stabilizing control against swaying or jack-knifing of the trailer vehicle.

In the form of the improved linear viscous fluid damper 150, not only is the outer surface of the piston 158 in shear contact with the viscous fluid between the cylinder 152 and such piston surface, but shear is also effected upon movement of the piston against the viscous fluid which passes through the openings 170 in the web of the piston. This structural arrangement effectively improves the shear characteristic of the damper and resistance to rotation of the lever arm 143. In the damper structure 180, the shear resistance becomes a function of the surface contact of the piston rod 196 within the area of the gap 184 where the viscous fluid is disposed.

Similarly, in the linear viscous fluid dampers 210 and 240, the shear resistance of the viscous fluid entrained between the relatively moving surfaces of the plate members 218 and the fixed plates 212, 216 and 214 (FIGURES 12 and 13), and the piston rods 254 in the bock 242 (FIGURES 14 and 15), is dependent upon the area of land contact between such plate members or piston rods with the viscous fluid entrained between the relatively moving surfaces.

A stabilizing control device of the instant invention is considered to be substantially "fail safe" in view of the fact that the viscous fluid utilized in the dampers has a substantially constant high shear resistance, even under excessive loads or relatively high ambient temperatures, i.e. somewhat above atmospheric, whereby the damper device is very consistent in operation. It requires little or no maintenance. In each instance, the damper structure or the support plate for the damper structure and kingpin, should be firmly and fixedly secured to the wear plate of the trailer or to some equivalent supporting plate or member(s) so that the king pin is disposed in proper position in the trailer or trailing vehicle for engagement by the fifth wheel device.

It will be observed that the damper in each of the stabilizing control devices described above is substantially a closed system. Once the damper has been charged with viscous fluid, the fluid is not moved about nor forced through ports as in vane type damping devices of the prior art, but damping of rotative movement is effected by the shear resistance of the viscous fluid through the movement of one surface to another surface with the viscous fluid entrained therebetween. The spacing between such surfaces is of a very close tolerance, for instance of the order of from about .003 to about .005 inch, or less or more in some instances depending upon the shear characteristics or resistance of the particular viscous fluid utilized in any particular damper. Inasmuch as the tolerances of the components of the various dampers are sometimes difficult to maintain and may be subject to uncontrollable production variations, and the operating temperatures in various applications may subject particular dampers to greater or lesser expansion, the necessary shear characteristics and consequent torque resistance can often be provided by a change or modification of the viscous fluid.

These viscous fluids are the type known generally as silicone fluids including the dimethyl polysiloxane fluids. The Dow-Corning Corporation, of Midland, Mich., is a principal producer of such viscous fluids for use in the types of dampers hereindisclosed, and such rotary or linear dampers are designed to function with silicone fluids identified as type 210 or 210H (Dow-Corning), as well as other viscous fluids, ranging from a viscosity of from about 1,000 to 1,000,000 centistokes or more.

Although only a single rotary damper rotor flange member 38 is described above and illustrated in FIGURE 3, it is to be clearly understood that a plurality of such rotor members alternating with fixed blades or discs secured to the housing 32 can be used to increase the torque and viscous fluid shear resistance of the damper 30. Reference is again here made to the O'Connor Patent, No. 2,514,137.

The rotary and linear damper structures, as well as the king pin and lever arm device, are made of metals suitable to the load requirements of particular applications, including alloy steels and cold-rolled or hot-rolled steels, and where required the metal surfaces are hardened and ground. The seals for the viscous fluid are preferably made of materials resistant to destructive decomposition by the silicone fluids above described. Such seal materials could include neoprene, vinyls, or compositions of various materials well known in the art in which such seals would form a part.

Having described the invention in its simplest terms, it is to be clearly understood that the features of construction may be changed or varied in greater or lesser degree without departing from the essence of the invention.

I claim:

1. In a stabilizing control device for articulated vehicles, the combination comprising
   a rotatable kingpin device,
      said device comprising a kingpin having a radially extending lever arm fixedly secured thereto adjacent but spaced from the digital end thereof, and
   viscous fluid damper means associated conjoined to the proximal end of said kingpin device and resistantly responsive to rotation of said kingpin device so as to damp the rotation of said device.

2. The structure defined in claim 1, and in which said viscous fluid damper means comprises
   a housing having a bore and a counterbore,
   a rotor member having a hub adapted to rotate in said housing bore and a flange on said hub adapted to rotate in said counterbore,
      said rotor member hub being secured to said proximal end of said king pin device so that said rotor member and said king pin device rotate together simultaneously,
   a cover plate for said housing adapted to be secured thereto and having a bore therethrough to receive a portion of said rotor member hub for rotation therein,
      said cover plate forming with said housing a chamber of said counterbore for viscous fluid and said rotor member flange, and
   shear resistant viscous fluid filling said counterbore chamber and about said rotor member flange and providing relative resistance to rotation of said flange and said kingpin device in proportion to the viscosity of said fluid.

3. The structure defined in claim 2, and in which
   a rotational control plate is secured to the proximal end of said kingpin device for rotation therewith, and
   rotation limiting means engageable by said control plate is secured to said cover plate for controlling the extent of rotation of said kingpin device.

4. The structure defined in claim 2, and in which
   said cover plate is provided with inlet ports for the admission of viscous fluid to said counterbore chamber, and
   means in said ports to close the same.

5. The structure defined in claim 2, and in which said rotor member hub is provided with a splined bore and said proximal end of said kingpin device is splined for mating engagement of said proximal end in said hub bore, whereby said hub and said kingpin device rotate together simultaneously.

6. The structure defined in claim 2, and in which said rotor member flange is provided with a plurality of viscous fluid passages therethrough.

7. The structure defined in claim 3, and in which
   said rotational control plate is provided with a radially projecting lug, and
   said cover plate is provided with a pair of spaced apart dowel pins disposed in the rotational path of said control plate lug to limit rotation of said control plate and said kingpin device.

8. The structure defined in claim 2, and in which said lever arm is affixed to said kingpin outwardly of said damper housing.

9. The structure defined in claim 1, and in which said viscous fluid damper means comprises
   a housing having a bore and a counterbore,
   a rotor member having a hub adapted to rotate in said housing bore and a plurality of spaced apart parallel flanges on said hub adapted to rotate in said counterbore,
   a plurality of spaced apart parallel plate members arranged on a common axis with said rotor member hub, and alternately with said hub flanges, and secured to said housing for projection into said counterbore,
      said rotor member hub being secured to said proximal end of said kingpin device so that said rotor member and said kingpin device rotate together simultaneously,
   a cover plate for said housing adapted to be secured thereto and having a bore therethrough to receive a portion of said rotor member hub for rotation therein,
      said cover plate forming with said housing a chamber of said counterbore for viscous fluid and said plurality of hub flanges and said plurality of alternating housing secured plate members, and
   shear resistant viscous fluid filling said counterbore chamber and providing relative resistance to rotation of said hub flanges and said kingpin device in proportion to the viscosity of said fluid.

10. The structure defined in claim 1, and in which said viscous fluid damper means comprises
   a support plate,
   a bearing support for said kingpin device mounted upon and secured to said support plate, and
   a linear viscous fluid damper mounted for pivoting movement on said support plate,
      said kingpin device having its proximal end disposed for rotation in and through said bearing support,
a rotational control plate secured to said proximal end of said kingpin device for rotation therewith, and
means associatedly conjoined to said linear viscous fluid damper and pivotally conjoined to said rotational control plate eccentrically thereof for translating the rotary motion of said kingpin device to said linear viscous fluid damper.

11. The structure defined in claim 10, and including rotation limiting means engageable by said control plate secured to said bearing support for controlling the extent of rotation of said kingpin device.

12. The structure defined in claim 10, and in which said rotational control plate is provided with a radially projecting element, and
said linear viscous damper is provided with an extended draw pin pivotally secured to said rotational control plate eccentrically thereof.

13. The structure defined in claim 11, and in which said bearing support is provided with a pair of spaced apart dowel pins disposed in the rotational path of said control plate to limit rotation thereof and said kingpin device.

14. The structure defined in claim 10, and in which said lever arm is affixed to said kingpin outwardly of said bearing support.

15. The structure defined in claim 10, and in which said linear viscous fluid damper comprises
a cylindrical housing,
means supporting said housing at one end thereof for pivoting movement of said damper,
a plurality of concentric movable cylinders within said housing disposed in relatively telescoping relationship with each other,
a plurality of chambers formed by said housing and said cylinders,
an extended draw pin secured to one of said cylinders at the end of said housing opposite said pivoting end and adapted to reciprocatingly move at least said one cylinder axially of said housing, and
shear resistant viscous fluid filling said housing and said chambers and providing relative resistance to axial movement of said cylinders relative to each other and said housing and to rotation of said rotational control plate and said kingpin device secured thereto in proportion to the viscosity of said fluid.

16. The structure defined in claim 10, and in which said linear viscous fluid damper comprises
a housing having a bore closed at each end thereof,
a piston slidably disposed within said housing bore,
a piston rod secured to said piston and extending through each of the closed ends of said housing bore, said piston comprising a sleeve portion and a web portion substantially medially thereof,
a plurality of viscous fluid ports through said web portion spaced radially about the axis of said piston, and
shear resistant viscous fluid filling said housing and said piston ports and providing relative resistance to axial movement of said piston relative to said housing and to rotation of said rotational control plate and said kingpin device secured thereto in proportion to the viscosity of said fluid.

17. The structure defined in claim 16, and in which said piston rod comprises an extended draw pin pivotally secured to said rotational control plate eccentrically thereof.

18. The structure defined in claim 16, and in which said housing is provided with a fixed end head at one end of said bore and a threadedly removable end head at the opposite end of said bore.

19. The structure defined in claim 10, and in which said linear viscous fluid damper comprises
a housing having a bore therethrough,
a counterbore in said bore extending longitudinally of said housing to a point adjacent but spaced from each end of said bore,
a viscous fluid inlet communicating with said counterbore,
a piston in said housing bore extending therethrough,
an extended draw pin secured to said piston and pivotally secured to said rotational control plate eccentrically thereof, and
shear resistant viscous fluid filling said housing counterbore and providing relative resistance to axial movement of said piston relative to said housing and to rotation of said rotational control plate and said kingpin device secured thereto in proportion to the viscosity of said fluid.

20. The structure defined in claim 19, and in which said piston is tubular in form and is provided with at least one closed end,
said extended draw pin being secured to said one closed end.

21. The structure defined in claim 16, and in which said piston rod extends through said closed ends of said housing bore at all positions of axial movement of said piston.

22. The structure defined in claim 19, and in which said piston extends through said housing bore and beyond the outer ends of said counterbore at all positions of axial movement of said piston.

23. The structure defined in claim 10, and in which said linear viscous fluid damper comprises
a top plate, a bottom plate and a plurality of intermediate spacer plates comprising a group of fixed plates secured together in parallel spaced apart relationship,
a plurality of movable slidable plate members arranged alternately with said intermediate spacer plates and between said top and bottom plates,
a plurality of laterally disposed fixed spacer bars in reigster with said slidable plate members at each lateral edge thereof between said fixed plates and secured thereto,
viscous fluid gaps between the surfaces of said fixed plates and adjacent surfaces of said slidable plate members,
connecting means affixed to said slidable plate members at one end thereof,
an extended draw pin secured to said connecting block and pivotally secured to said rotational control plate eccentrically thereof, viscous fluid inlet means in said top plate communicating with said fluid gap at said top plate surface adjacent one of said slidable plate members,
fluid passage means in said fixed plates communicating with said viscous fluid inlet means to allow said viscous fluid to pass to each of said gaps, and
shear resistant viscous fluid filling said gaps and providing relative resistance to longitudinal movement of said slidable plate members relative to said fixed plates and to rotation of said rotational control plate and said king pin device secured thereto in proportion to the viscosity of said fluid.

24. The structure defined in claim 10, and in which said linear viscous fluid damper comprises
a damper block having a plurality of bores extending in parallel through said block,
each of said bores having a counterbore extending to a point adjacent but spaced from each end of said bore,
a viscous fluid manifold affixed to said damper block and having inlet means thereinto,
a plurality of passages through said block communicating with said manifold and each passage communicating with a counterbore, a plurality of movable slidable pistons corresponding to the number of said bores disposed for sliding movement in said bores and extending beyond the longitudinal outer ends of said damper block at all positions of axial movement of said pistons, a connecting block affixed to said slidable pistons at one end thereof, an extended draw pin secured to said connecting block and pivotally secured to said rotational control plate eccentrically thereof, and shear resistant viscous fluid filling said manifold, passages and counterbores and providing relative resistance to longitudinal movement of said pistons relative to said block and to rotation of said rotational control plate and said kingpin device secured thereto in proportion to the viscosity of said fluid.

25. The structure defined in claim 24, and in which said slidable piston rods are cylindrical in form.

26. The structure defined in claim 23, and in which said slidable plate members extend beyond the longitudinal outer ends of said fixed plates at all positions of longitudinal movement of said plate members.

27. The structure defined in claim 1, wherein one of said vehicles is a draft vehicle and another of said vehicles is a drawn vehicle articulately connected together at said kingpin device, said damper means being fixedly secured to said drawn vehicle.

References Cited

UNITED STATES PATENTS

| | | | |
|---|---|---|---|
| 2,170,898 | 8/1939 | Humphrey | 280—432 |
| 2,514,137 | 7/1950 | O'Connor. | |
| 2,661,917 | 12/1953 | O'Connor | 244—104 |
| 2,692,146 | 10/1954 | Black | 280—432 |
| 3,231,295 | 1/1966 | Till | 280—432 |
| 3,328,051 | 6/1967 | Hope et al. | 280—432 |

FOREIGN PATENTS

| | | |
|---|---|---|
| 205,442 | 9/1956 | Australia. |
| 1,164,863 | 5/158 5/1958 | France. |
| 709,301 | 5/1954 | Great Britain. |
| 463,655 | 5/1951 | Italy. |

LEO FRIAGLIA, *Primary Examiner.*

U.S. Cl. X.R.

188—88, 90; 280—446